United States Patent
Yee

(10) Patent No.: US 6,450,563 B2
(45) Date of Patent: Sep. 17, 2002

(54) NOISE SHUT-OFF DEVICE FOR DOORS OF AUTOMOTIVE VEHICLE

(75) Inventor: Kaang-Dok Yee, Sungnam (KR)

(73) Assignee: le;.5qHyundai Motor Company, Seoul (KR)

( * ) Notice: Subject to any disclaimer, the term of this patent is extended or adjusted under 35 U.S.C. 154(b) by 0 days.

(21) Appl. No.: 09/751,697

(22) Filed: Dec. 26, 2000

(30) Foreign Application Priority Data

Jul. 21, 2000 (KR) .......................................... 2000-41941

(51) Int. Cl.[7] .................................................. B60J 9/00
(52) U.S. Cl. ...................... 296/154; 296/208; 137/849; 220/229
(58) Field of Search ................................ 296/208, 154; 137/845, 849; 52/302.7; 220/229, 254, DIG. 19

(56) References Cited

U.S. PATENT DOCUMENTS

| | | | |
|---|---|---|---|
| 3,382,889 A | * 5/1968 | Heinz et al. | |
| 4,176,877 A | * 12/1979 | Schulz et al. | 296/208 |
| 5,527,081 A | * 6/1996 | Rausch et al. | 296/208 X |
| 5,709,309 A | * 1/1998 | Gallagher et al. | 296/208 X |
| 5,873,623 A | * 2/1999 | Dunton et al. | 296/154 |

* cited by examiner

Primary Examiner—Joseph D. Pape
(74) Attorney, Agent, or Firm—Christie, Parker & Hale, LLP

(57) ABSTRACT

A noise shut-off device is provided for doors of an automotive vehicle to effectively prevent driving noises from being introduced to the vehicle interior through draining holes formed at the bottom of the vehicle door, while allowing the draining out of water through the draining holes. The device has an external cylinder member with an open part having a vertical cylindrical opening and a plurality of main capillary ribs protruding outward from the open part, and an internal cylinder member with a shaft part being vertically accommodated in the open part cylindrical opening and having a plurality of auxiliary capillary ribs extending outward from the external circumference of the shaft part.

6 Claims, 4 Drawing Sheets

NOISE SHUT-OFF DEVICE FOR DOORS OF AUTOMOTIVE VEHICLE

CROSS-REFERENCE TO RELATED APPLICATION

This application claims priority of Korea patent Application No. 2000-41941, filed on Jul. 21, 2000

BACKGROUND OF THE INVENTION

1. Field of the Invention

The present invention relates to a noise shut-off device for doors of an automotive vehicle and more particularly to a noise shut-off device for doors of an automotive vehicle for effectively shutting off a variety of noises in driving from being induced through draining holes formed at the bottom of internal panels to drain out water filled inside of doors in raining, thereby improving quietness at the internal room of the vehicle.

2. Description of the Prior Art

In general, a body of a vehicle is made of various metal plates through manufacturing steps like a press molding process, combining steps like welding and fastening processes for molded metal plates and other assembling steps required for complete production. Especially, doors 10 to be opened or closed at the body for passenger's getting on or off the vehicle are, as shown in FIG. 1, hinged at both sides of the body for rotation.

Furthermore, the door 10 is formed with internal and external panels 12, 14 (shown in FIG. 2). A plurality of draining through-holes 12a are pierced at the bottom of the internal panel 12 approximately in the vertical direction At this time, the through-holes 12a are formed at the internal panel 12 of the door for draining out raindrops that form and roll along a glass 10a to be induced and filled at an internal space of the door.

However, the through-holes 12a formed at the internal panel 12 of the door 10 for the aforementioned function may also be played as a passage to induce various noises in driving as shown in FIG. 2. The driving noises are largely classified into road noise conveying from surface of road and wind noise generating with induction of external air. The various noises as such get into the internal part of the door 10 in sequence through gaps between scuff panel 16 and door 10 and through through-holes 12a. Since the road noise induces into the door 10 and then into the room of the vehicle through gaps between the door 10 and glass 10a, it is disadvantageous in disrupting quietness at the internal room of the vehicle.

SUMMARY OF THE INVENTION

Therefore, the present invention is disclosed to solve the aforementioned problem and it is an object of the present invention to provide a noise shut-off device for doors of an automotive vehicle for effectively shutting off a variety of driving noises from inducing through draining holes formed at the bottom of the door, while the draining holes can also play their function of draining out water, thereby preventing the deterioration of quietness at the internal room of the vehicle caused by driving noises inducing via draining through-holes.

In order to accomplish the aforementioned object of the present invention, there is provided a noise shut-off device for doors of an automotive vehicle fastened with internal and external panels having draining through-holes at the bottom thereof, the device in the draining through-holes including: an external cylinder member with an open part being vertically pierced in the cylindrical shape and a plurality of main capillary ribs being deposited at the interval of multi-layers externally protruded all over the external circumference of the open part; and an internal cylinder member with a shaft part being vertically accommodated in the open part of the external cylinder member and a plurality of auxiliary capillary ribs being deposited at the interval of multi-layers externally protruded all over the external circumference of the shaft part.

Also, the interval of the auxiliary capillary ribs formed at the external circumference of the shaft of the internal cylinder member in the shape of multi-layers is smaller than that of the main capillary ribs formed at the external circumference of the external cylinder member.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, an embodiment of the present invention will be described in detail with reference to the accompanying drawings.

Figure 1:
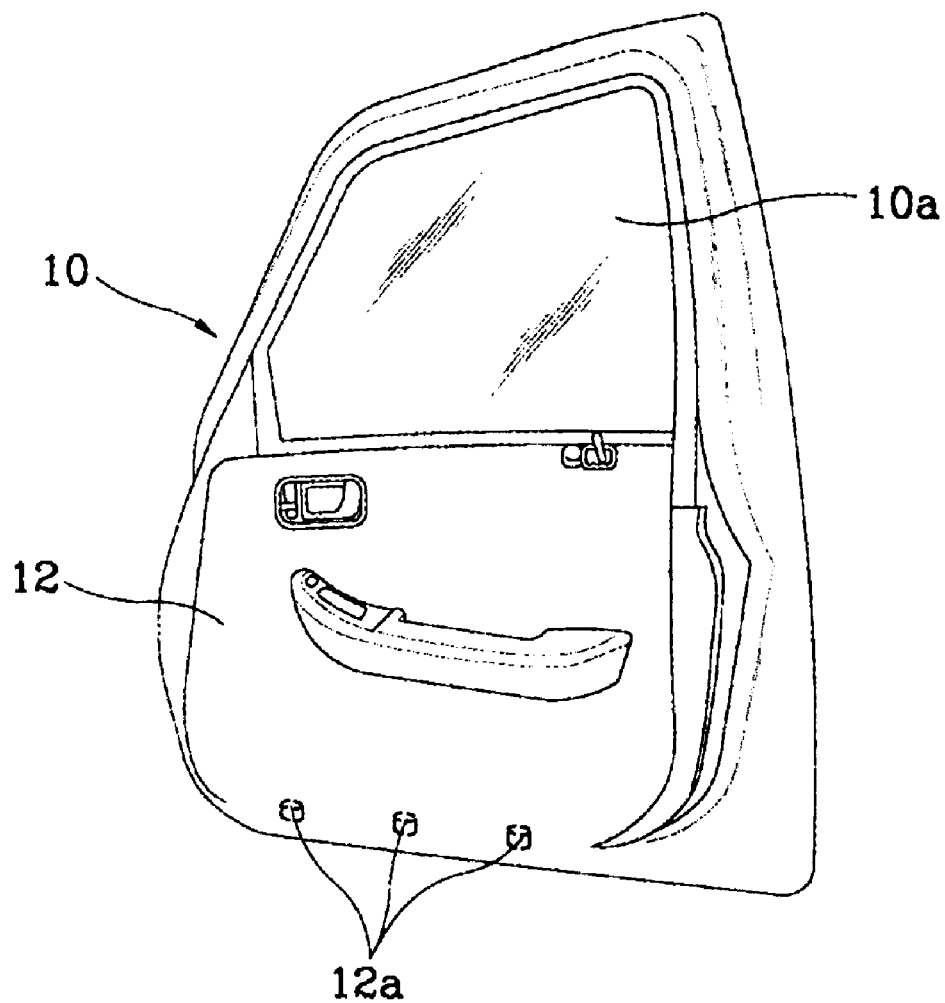
FIG. 1 is a perspective view for schematically illustrating an internal part of a door of a general automotive vehicle.
Figure 2:
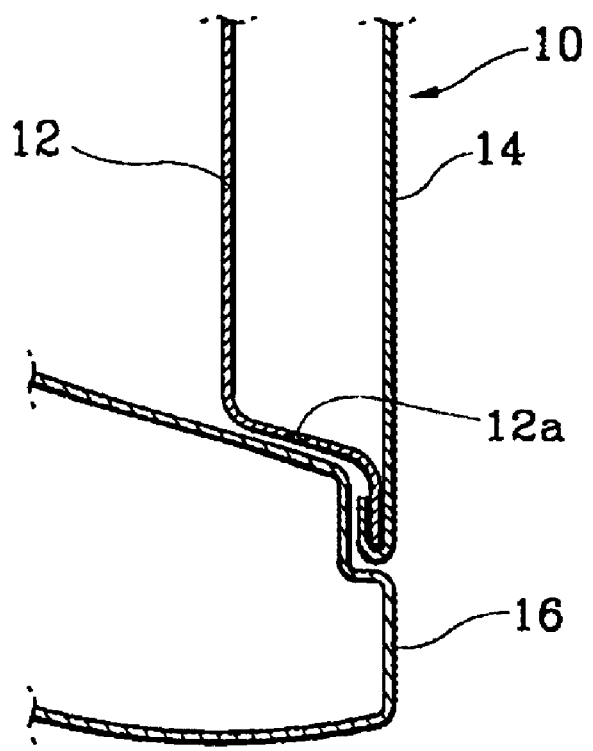
FIG. 2 is a cross-sectional view for schematically illustrating a section between through-holes and their corresponding scuff panel formed at the bottom of the internal panel of the general door.
Figure 3:
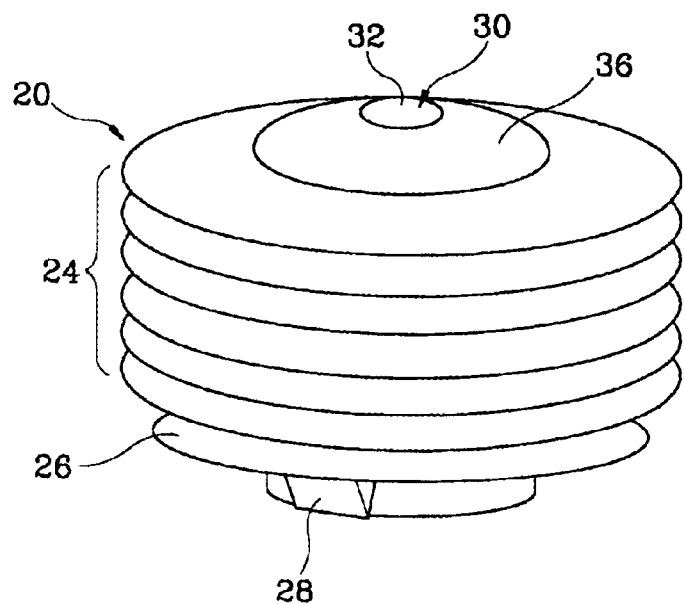
FIG. 3 is a perspective view for illustrating a noise shut-off device for a door of an automotive vehicle in accordance with the present invention.
Figure 4:
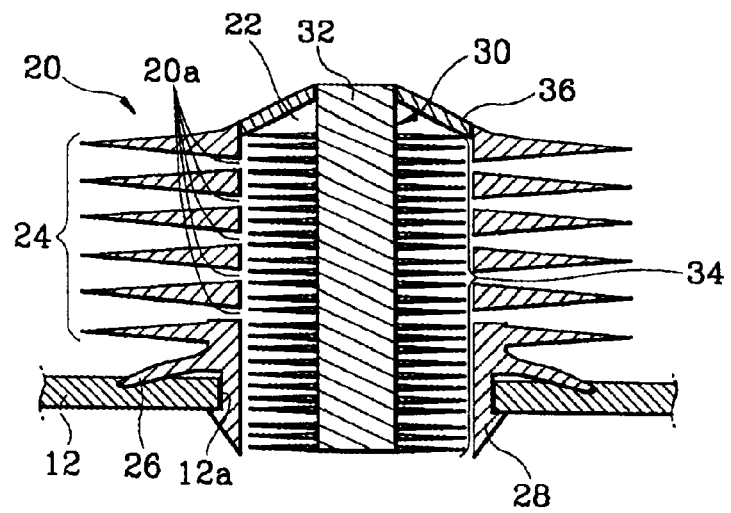
FIG. 4 is a vertical cross-sectional view of FIG. 3 for illustrating a state of a noise shut-off device installed at the internal panel of the door.

FIG. 3 is a perspective view for illustrating a noise shut-off device for a door of an automotive vehicle in accordance with the present invention, and FIG. 4 is a vertical cross-sectional view of FIG. 3 for illustrating a state of a noise shut-off device installed at the internal panel of the door. Detailed description of the present invention will be described with reference to FIG. 1 illustrating a general door of a vehicle and FIG. 2 illustrating the gap between door and scuff panel.

As shown in FIG. 3 and FIG. 4, the noise shut-off device of the present invention is formed with a noise shut-off member installed at through holes 12a formed at the bottom of an internal panel 12 of a door 10.

In other words, the noise shut-off member includes: an external cylinder member 20 with an open part 22 being vertically pierced lengthwise at the center thereof in the cylindrical shape and a plurality of main capillary ribs 24 being deposited at the interval of multi-layers externally protruded all over the external circumference of the open part; and an internal member 30 with a shaft part 32 being vertically accommodated in the open part formed at the center of the external cylinder member 20 and a plurality of auxiliary capillary ribs 34 being deposited at the interval of multi-layers externally protruded all over the external circumference of the shaft part 32.

Also, the external cylinder member 20 includes: a fixing rib 26 formed at the lower portion thereof for being attached to the internal surface of the through-holes 12 to get inserted into the through hole 12a formed at the internal panel 12 of the door 10; and an integrated type of a hitching protruder 28 vertically protruded from the fixing rib 26 for being inserted through the internal surface of the through-holes 12a and hitched to the external surface of the through-holes 12a, thereby preventing rattle noise that may generate at the noise shut-off device installed at the through-holes 12a of the internal panel 12 due to vibrations of a driving vehicle.

In addition, a plurality of pierced parts 20a are formed among the main capillary ribs 24 deposited all over the external circumference of the external cylinder member 20 in the shape of multi-layers to be correspondingly connected with the internal open part 22, so that water can be induced from outside to the internal open part 22.

On the other hand, an integral type of a covering part 36 is formed over the shaft part 32 of the internal cylinder member 30 with its center portion being convex and its edges being slightly lowered for being fit with the open part 22 of the external cylinder member 20. As a result, if water forming at the auxiliary capillary ribs 34 of the internal cylinder member 30 vaporizes in the internal open part 22 of the external cylinder member 20, the vaporizing moisture is induced by contacting the internal surface of the cover part 36 and flowing down into the open part 22.

At this time, the interval of the main capillary ribs formed at the at the external circumference of the external cylinder member in the shape of multilayers is larger than that of the auxiliary capillary ribs formed at the external circumference of the shaft of the internal cylinder member in the shape of multilayers.

Furthermore, the main capillary ribs 24 of the external cylinder member 20 and the auxiliary ribs 34 of the internal cylinder member 30 are formed in thickness that gradually gets smaller from the center to the edge.

Accordingly, the external and internal cylinder members 20 and 30 can smoothly induce water from outside via the main and auxiliary capillary ribs 24 and 34 and continuously store the water at the space respectively formed between ribs.

Operations of the noise shut-off device for doors of an automotive vehicle will be described in detail in accordance with the present invention.

Figure 5:
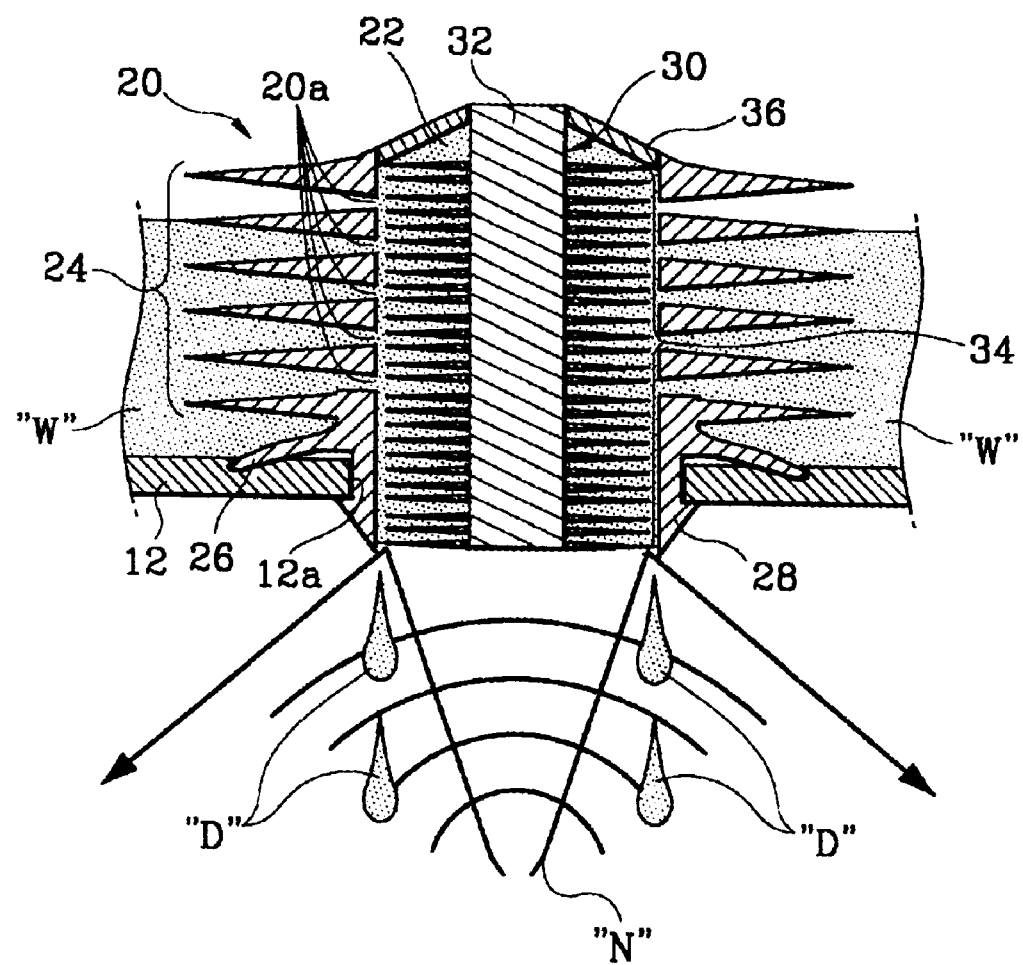
FIG. 5 illustrates operational states of a noise shut-off device when water filled in the internal part of the door is drained out and when noise inducing from outside is shut off.

First of all, as shown in FIG. 5, raindrops inducing along the glass 10a to the internal part of the door 10 are collected at the bottom of a space formed between internal and external panels 12 and 14, and the water W collected as such infiltrates among a plurality of main capillary ribs 24 formed at the external cylinder member 20 of the noise shut-off member and, further, into the open part 22 through the pierced part 20a formed between main capillary ribs 24.

Secondly, the water W collected in the open part 22 of the external cylinder member 20 infiltrates among a plurality of auxiliary capillary ribs 34 formed around the external circumference of the shaft part 32 of the internal cylinder member 30.

At this time, the water W collected at the internal part of the door 10 infiltrates and attracted among the main capillary ribs of the external cylinder member 20 and the auxiliary capillary ribs 34 of the internal cylinder member because of a capillary phenomenon in which liquid continuously rises along peripheral members in its surface tension.

Also, in the capillary phenomenon, the smaller the diameter of the capillary tube is formed, the higher the level of liquid surface gets with an increase of the surface tension.

In addition, if the quantity of water W to bringing about rise in the level of liquid surface increases at the external and internal cylinder members 20, 30, the water W stored at the auxiliary capillary ribs 34 of the internal cylinder member 30 may drop down in a drop D by gravity and drain out through the through-holes 12a of the internal panel 12 and the scuff panel 16.

On the other hand, if water flowing at the internal space of the door 10 is infiltrated and collected not only among of the main capillary ribs 24 of the external cylinder member 20, but also among the internal open part 22 of the external cylinder member 20 and auxiliary capillary ribs 34 of the internal cylinder member 30, a variety of driving noises N like road and wind noises, which may induce to the internal part of the door 10 through through-holes 12a formed at the bottom of the internal panel 12, are completely blocked by the noise shut-off member to thereby make a contribution to keeping quietness at the internal room of the vehicle.

In other words, the noise shut-off member is constructed to continuously store water W of raindrops collected at the internal s pace of the door 10 at the main and auxiliary ribs 24 and 34, so that various noises N inducing from outside are shut off by the water W stored at the ribs 24 and 34.

Also, even if the water W stored among all the ribs 24, 34 is drained by any external factors like vibration of the body, the noise shut-off member can effectively block the inducing noises N with the shape of the auxiliary capillary ribs 34 of the internal cylinder member 30

As described above, there is an advantage in the noise shut-off device of the present invention in that a noise shut-off member is installed at the through-holes 12a formed at the bottom of the door 10 for smoothly draining out the rain water collected at the internal part of the door 10 and preventing various driving noises inducing through the through-holes 12a with water W collected by the noise shut-off member to thereby improve quietness at the internal room of the vehicle.

What is claimed is:

1. A noise shut-off device for a door of an automotive vehicle, the door having an internal and an external panel and a draining through-hole at the bottom of one panel, the device being fitted in said draining through-hole and comprising:

an external cylinder member having an open part, a cylindrical shaped opening and a plurality of main capillary ribs protruding externally from the open part; and an internal cylinder member having a shaft part being accommodated in the cylindrical shaped opening of the open part and having a plurality of auxiliary capillary ribs extending outwardly from the shaft part.

2. The device, as defined in claim 1, wherein each of the auxiliary capillary ribs is spaced apart from an adjacent auxiliary capillary rib by a first interval, wherein each of the main capillary ribs is spaced apart from an adjacent main capillary rib by a second interval, wherein the first interval is smaller than the second interval.

3. The device, as defined in claim 1, wherein each of the main and auxiliary capillary ribs extend radially outward and have a thickness that gradually increases in a radially inward direction.

4. The device, as defined in claim 1, wherein the external cylinder member includes a fixing rib for being attached to an internal surface of the panel surrounding said through-hole and an integrated hitching protruder vertically protruding from the fixing rib for penetrating said through-hole and hitching on an external surface of the panel surrounding said through-hole.

5. The device, as defined in claim 4, wherein a plurality of openings are formed through the open part between said main capillary ribs extending to the cylindrical shaped opening of the open part.

6. The device, as defined in claim 2, wherein an integral covering part is formed over the shaft part of the internal cylinder member, wherein a center portion of said covering part is convex and wherein said covering part has edges which are lower in relation to the center part for being mated with the open part of the external cylinder member.

* * * * *